United States Patent
DiTommaso et al.

(10) Patent No.: US 6,535,124 B1
(45) Date of Patent: Mar. 18, 2003

(54) METHOD AND APPARATUS FOR DIGITAL ANALYSIS AND SIGNAL CONDITIONING IN A TURBINE GENERATOR SILO COMBUSTOR

(75) Inventors: Anthony M. DiTommaso, Cranberry Township, PA (US); Kevin Dowdell, Pittsburgh, PA (US); Michael J. Kleya, Monroeville, PA (US); William J. Kline, Penn, PA (US)

(73) Assignee: ABB Automation Inc., Norwalk, CT (US)

( * ) Notice: Subject to any disclaimer, the term of this patent is extended or adjusted under 35 U.S.C. 154(b) by 210 days.

(21) Appl. No.: 09/824,972

(22) Filed: Apr. 3, 2001

(51) Int. Cl.[7] .............................................. G08B 23/00
(52) U.S. Cl. ...................... 340/529; 340/438; 340/439; 340/511; 123/294; 701/100
(58) Field of Search .................. 340/529, 511, 340/438, 439, 441; 123/294, 431, 432; 701/100, 101, 102

(56) References Cited

U.S. PATENT DOCUMENTS

| | | | | |
|---|---|---|---|---|
| 4,058,975 A | * | 11/1977 | Gilbert et al. | 60/39.28 T |
| 4,115,998 A | * | 9/1978 | Gilbert et al. | 60/39.09 R |
| 4,335,378 A | * | 6/1982 | Coleman | 340/629 |
| 5,682,317 A | * | 10/1997 | Keeler et al. | 364/431.03 |
| 5,685,284 A | * | 11/1997 | Nakamichi | 123/688 |

* cited by examiner

*Primary Examiner*—Daniel J. Wu
*Assistant Examiner*—Phung T Nguyen
(74) *Attorney, Agent, or Firm*—Michael M. Rickin

(57) ABSTRACT

A method and apparatus for analyzing and signal conditioning the pulsation signal derived from combustion of fuel in a turbine. There are one or more user defined frequency bands and the method and apparatus provides a digital signal for the true RMS value of each of the user defined bands. Turbine protection logic has as its input the digital true RMS values for each such band and inspects that value to determine if the frequencies in that band exceed a predetermined level for a predetermined period of time.

17 Claims, 5 Drawing Sheets

METHOD AND APPARATUS FOR DIGITAL ANALYSIS AND SIGNAL CONDITIONING IN A TURBINE GENERATOR SILO COMBUSTOR

FIELD OF THE INVENTION

This invention relates to gas turbines and more particularly to the analysis of a pulsation signal derived from the combustion of fuel in the turbine. The pulsation signal is an indication of the fuel burning efficiency within the silo combustor.

DESCRIPTION OF THE PRIOR ART

During the operation of gas turbines, a pulsation signal derived from the fuel combustion within the silo combustor of a gas turbine can be monitored to detect efficiency, degradation and optimize cleaning intervals. The pulsation signal is monitored during turbine operation and alarm and trip signals are generated based on exceeding thresholds.

The prior art has shown that the analysis and signal conditioning of the pulsation signal can be performed with a combination of analog and digital technology. It is, however, desirable that the analysis and signal conditioning of the pulsation signal be performed solely by digital means as digital analysis and signal conditioning has advantages not only in manufacture but also in performance. The method of the present invention provides that digital analysis and signal conditioning.

SUMMARY OF THE INVENTION

A method for analyzing and conditioning the analog pulsation signal derived from combustion of fuel in a turbine. The method has the following steps:

(a) converting the analog pulsation signal to a digital signal;
(b) digitally filtering the digital signal;
(c) providing from the digitally filtered digital signal a digital value which is the true RMS value of a user defined predetermined frequency band of the analog pulsation signal;
(d) determining if an alarm output is on;
(e) determining when an alarm output is not on if the digital true RMS value is greater than a predetermined alarm limit;
(f) incrementing an alarm timer when the digital true RMS value is greater than the predetermined alarm limit; and
(g) outputting an alarm when the count in the alarm timer is greater than a predetermined accumulated time.

A method for analyzing and conditioning the analog pulsation signal derived from combustion of fuel in a turbine. The method has the following steps:

(a) converting the analog pulsation signal to a digital signal;
(b) digitally filtering the digital signal;
(c) providing from the digitally filtered digital signal a digital value which is the true RMS value of a user defined predetermined frequency band of the analog pulsation signal;
(d) determining if an alarm output is on;
(e) determining when the alarm output is not on if the digital true RMS value is greater than a user defined predetermined alarm limit; and
(f) determining if an alarm counter has a count greater than zero when the digital true RMS value is not greater than the predetermined alarm limit.

A method for analyzing the analog pulsation signal derived from combustion of fuel in a turbine. The method has the following steps:

(a) converting the analog pulsation signal to a digital signal;
(b) digitally filtering the digital signal;
(c) providing from the digitally filtered digital signal a digital value which is the true RMS value of a user defined predetermined frequency band of the analog pulsation signal;
(d) determining if an alarm output is on; and
(e) determining when the alarm output is on if the digital true RMS value is less than a predetermined limit.

A method for analyzing the analog pulsation signal derived from combustion of fuel in a turbine. The method has the following steps:

(a) converting the analog pulsation signal to a digital signal;
(b) digitally filtering the digital signal;
(c) providing from the digitally filtered digital signal a digital value which is the true RMS value of a user defined predetermined frequency band of the analog pulsation signal;
(d) determining if at least one of a plurality of predetermined conditions exist to stop processing of the digital true RMS value; and
(e) stopping processing of the true digital RMS value when at least one of the plurality of predetermined conditions exist.

An apparatus for analyzing an analog pulsation signal derived from combustion of fuel in a turbine. The apparatus has:

(a) means for converting the analog signal to a digital signal;
(b) a digital signal processor for digitally filtering the digital signal and providing therefrom a digital value of a user defined predetermined frequency band of the analog pulsation signal;
(c) a digital processor; and
(d) a routine executed by the digital processor for:
  (i) determining if an alarm output is on;
  (ii) determining when an alarm output is not on if the digital true RMS value is greater than a user defined predetermined alarm limit;
  (iii) incrementing an alarm timer when the digital true RMS value is greater than the predetermined alarm limit; and
  (iv) outputting an alarm when the count in the alarm timer is greater than a predetermined accumulated time.

DESCRIPTION OF THE PREFERRED EMBODIMENT(S)

Figure 1:
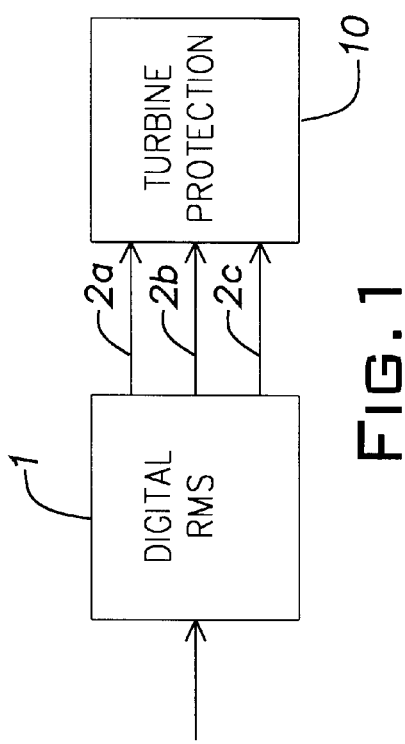
FIG. 1 shows a block diagram for the circuit that provides at its output the digital true RMS value for frequency bands in the pulsation signal to be used in the turbine protection logic.

Referring now to FIG. 1 there is shown in block diagram form the circuit 1 which has as its input the pulsation signal and provides at outputs 2a, 2b and 2c an associated one of three digital signals which are the RMS values of the pulsation signal. The digital signal at output 2a is the user defined low frequency band RMS value of the pulsation signal. The digital signal at output 2b is the user defined middle frequency band RMS value of the pulsation signal and the digital signal at output 2c is the user defined high frequency band RMS value of the pulsation signal. Also shown in FIG. 1 is the turbine protection logic 10 that monitors the digital outputs from digital RMS circuit 1 in order to provide as needed alarms and/or trip the turbine.

Figure 2:
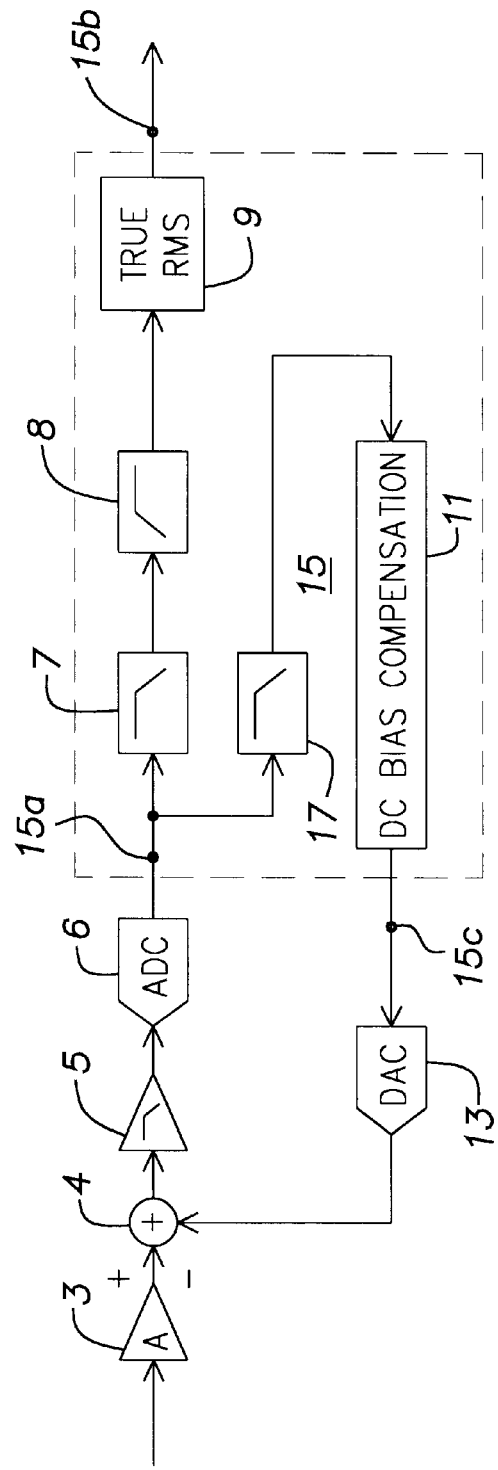
FIG. 2 shows one embodiment for the digital RMS circuit, the signal conditioning, and the discretization of the input shown in block diagram form in FIG. 1.

Referring now to FIG. 2 there is shown a diagram for an embodiment for the digital RMS circuit 1. Circuit 1 receives the analog pulsation signal at an amplifier 3. The output of amplifier 3 is connected to a summing junction 4 the output of which is the input to anti-aliasing filter 5. The output of the filter 5 is connected to an analog to digital converter (ADC) 6 which converts the analog signal at its input to a digital signal at its output. The frequency of the anti-aliasing filter 5 is selected to be less than or equal to one-half the throughput frequency of ADC 6. The output of ADC 6 is connected to the input 15a of digital signal processor (DSP) 15.

In the embodiment described herein DSP 15 is embodied as a single digital integrated circuit that conditions and analyzes the three user defined frequency bands to thereby determine the user defined low frequency band RMS value, the user defined middle frequency band RMS value and the user defined high frequency band RMS value. Thus from the pulsation signal DSP 15 provides at its output 15b the low frequency band RMS value, the middle frequency band RMS value and the high frequency band RMS value of the pulsation signal. In effect, output 15b is output 2a of FIG. 1 for the DSP 15 that provides at its output the low frequency band RMS value, output 2b for the DSP 15 that provides at its output the middle frequency band RMS value and output 2c for the DSP 15 that provides at its output the high frequency band RMS value.

The digital signal at input 15a of DSP 15 is first passed through a low pass filter 7 which in the embodiment for DSP 15 described herein is designed as a four pole Chebychev filter. The output of filter 7 is then passed through a high pass filter 8 which in the embodiment for DSP 15 described herein is also designed as a four pole Chebychev filter and then through a block 9 to provide at output 15b the true RMS value for either the low frequency band, the middle frequency band or the high frequency band of the pulsation signal to turbine protection logic 10.

The input 15a is also connected to a lowpass filter 17 which in the embodiment described herein for DSP 15 is designed as a two pole Butterworth filter. From there it is connected to a DC bias compensation block 11 which is used to capture the DC bias, if any, in the pulsation signal. The pulsation signal is a time varying signal that may depending on the type of probe used have a DC bias which is relatively high in amplitude as compared to the amplitude of the time varying signal and therefore it is desirable to compensate for that bias. Block 11 may be embodied as any circuit which has the capability to capture the bias in a signal. The captured DC bias is provided at output 15c of DSP 15 to digital to analog converter 13 where the removed DC bias is converted to an analog signal which is then connected to the negative input of summing junction 4 to thereby compensate for and thus remove the DC bias in the pulsation signal.

Figure 3:
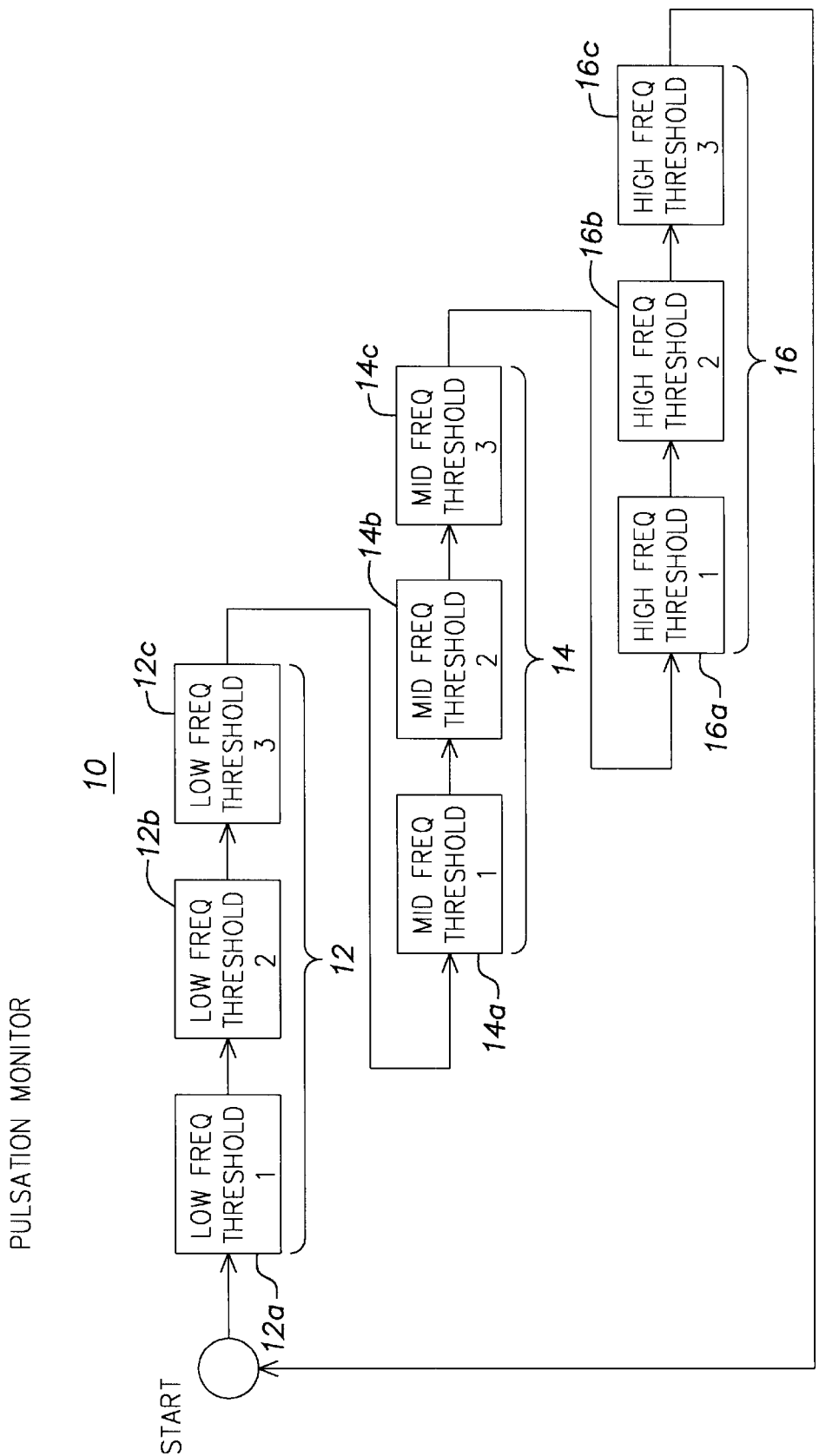
FIG. 3 shows an overview for the turbine protection logic of FIG. 1.

Referring now to FIG. 3, there is shown an overview flow diagram for the turbine protection logic 10 in the pulsation monitor of the present invention. The pulsation signal derived from the fuel injection of the silo combustor of a gas turbine is separated into three different frequency bands. These bands are identified in FIG. 3 as low 12, middle 14 and high 16. Each band 12, 14 and 16 has three thresholds 1, 2 and 3 identified in FIG. 3 by an associated block 12a, 12b and 12c for band 12; 14a, 14b and 14c for band 14; and 16a, 16b and 16c for band 16; which has the name of the frequency band and the number 1 or 2 or 3 therein.

As will be described in more detail below, the logic 10 inspects the three different frequency bands 12, 14 and 16 in the pulsation signal and outputs an alarm if the frequencies in that band exceed a predetermined level for a predetermined period of time. Also as will be described below, the alarm signal may be blocked by certain conditions that are occurring at specified times in the use of the gas turbine to avoid nuisance alarms or prevent a turbine trip.

Figure 4:
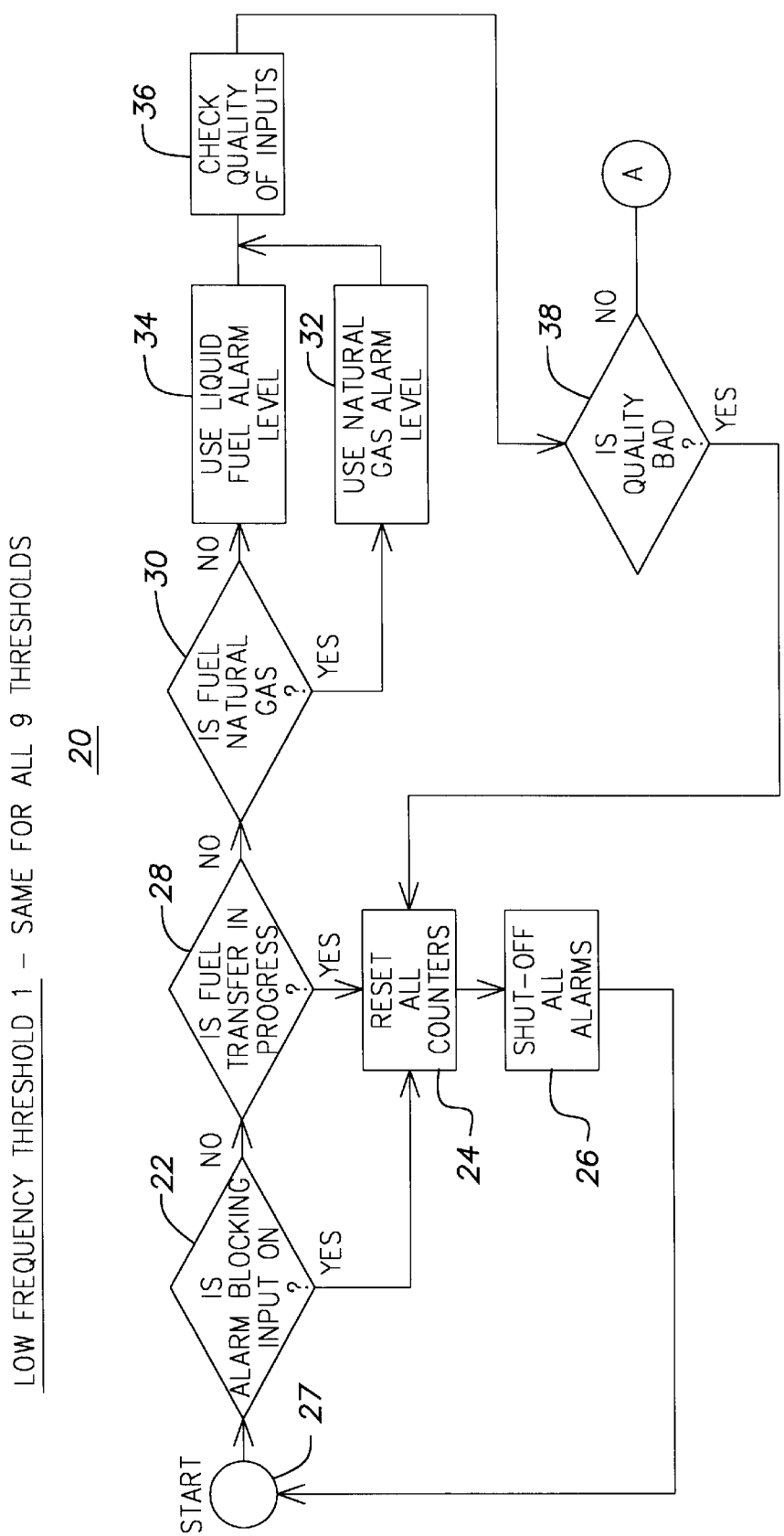
FIGS. 4, 5 and 6 show a flow diagram for the software implemented logic in one of the thresholds included in the logic of FIG. 3.
Figure 5:
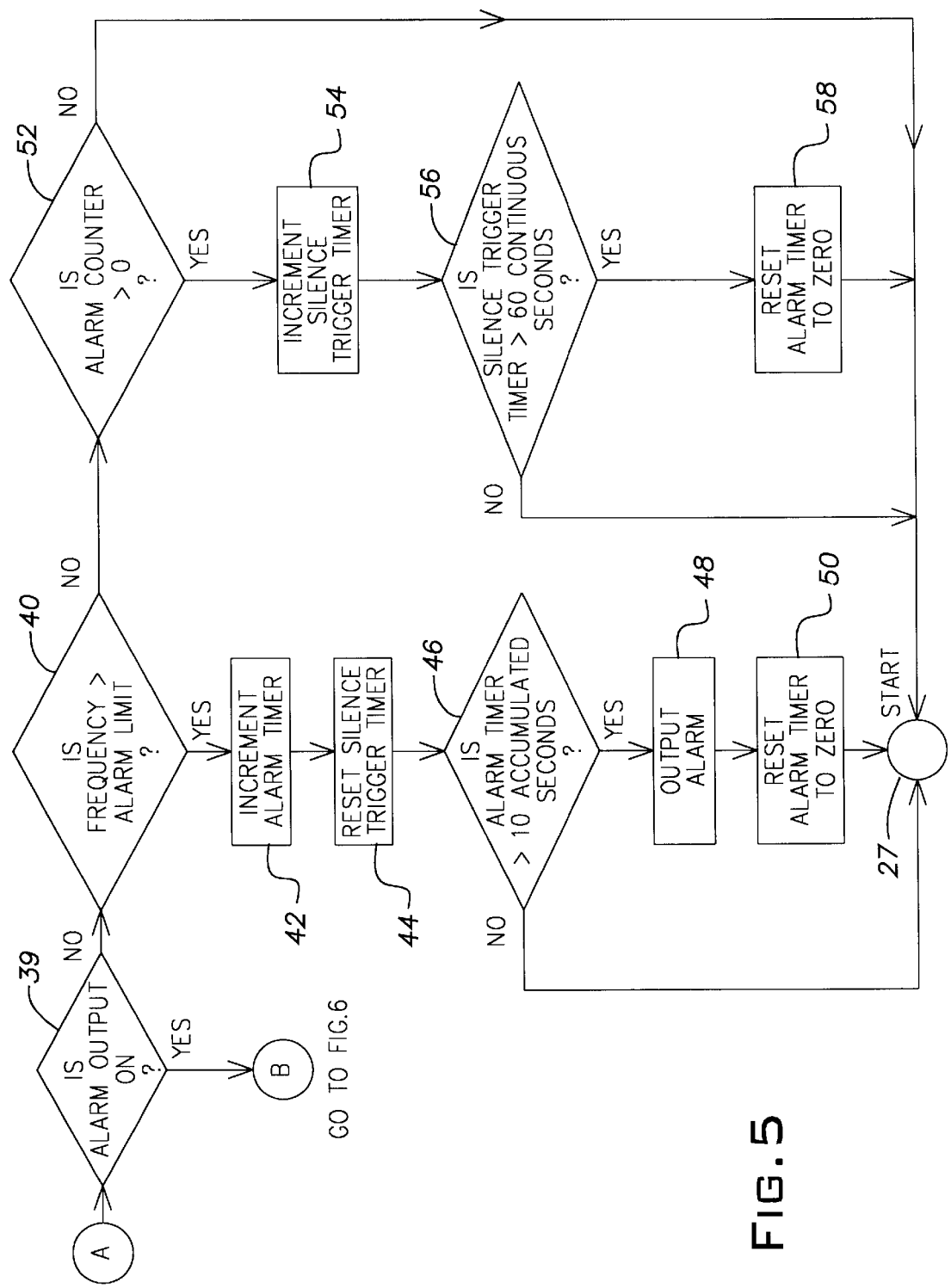
Figure 6:
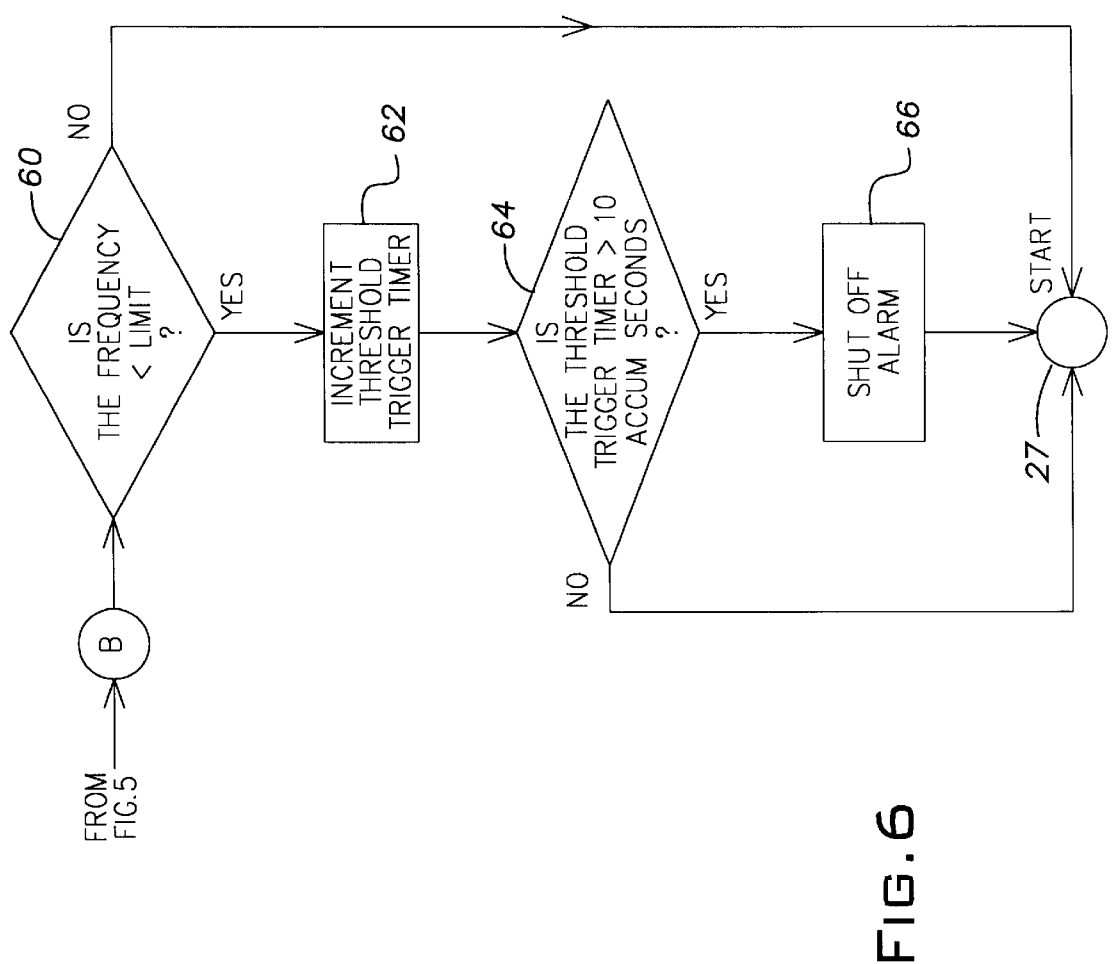

Referring now to FIGS. 4, 5 and 6 there is shown a flow diagram 20 for the software implemented logic of low frequency threshold 1 block 12a of band 12 of FIG. 3. The logic flow diagram for each of the other eight thresholds 12b, 12c, 14a, 14b, 14c, 16a, 16b and 16c shown in FIG. 3 is identical to the flow diagram shown in FIGS. 4, 5 and 6.

Each of the three different frequency bands 12, 14 and 16 has alarm limit settings that the pulsation signal must stay below to avoid outputting an alarm. There are six total alarm limit settings associated with each frequency band. Three of the six total alarm limit settings are used when the fuel of the gas turbine is natural gas, and the other three of the six total alarm limit settings are used when liquid fuel is used in the turbine. An input to the system instructs the logic of flow diagram 20 which set of limits the logic is to utilize. Once a type of fuel has been selected for use, a total of nine different alarms are possible.

There are operating conditions of a gas turbine such as synchronization and the opening of the gas staging valves during which the monitored frequencies will exceed the pre-set limits. These operating conditions are well known and have been found to be acceptable and thus during their occurrence it is necessary to block the generation of alarms and such alarms are known as nuisance alarms. The software logic 20 has been designed to use a digital input for the purpose of blocking nuisance alarms. In addition to a digital input for blocking nuisance alarms, the software allows the user to individually determine which of the nine different alarms may be blocked through the use of software On/Off switches.

Referring now to FIG. 4, the software implemented logic 20 starts at 27 and then proceeds to decision block 22 whereat it determines if the alarm blocking input is on. If the alarm blocking input is on, the logic proceeds to block 24 whereat it resets all counters and then to block 26 where it shuts off all alarms. Thereafter the logic returns to start 27. For as long as the alarm blocking input is on the logic stays in the loop formed by start 27 and blocks 22, 24, and 26.

If the alarm blocking input is not on the logic proceeds to decision block 28 whereat it determines if there is a fuel transfer in progress. A transfer of fuel while the system is running also blocks alarms that may be generated during the fuel transfer process. If decision block 28 determines that there is transfer of fuel in progress the logic proceeds to blocks 24 and 26 to perform the functions described above and then back to start 27. For as long as there is a fuel transfer occurring while the system is running and the alarm blocking input is not on the logic 20 stays in the loop formed by start 27 and blocks 22, 28, 24 and 26.

In addition to decision block 28, there is logic (not shown) associated with a fuel transfer while the system is in operation which allows the user to adjust the time period that is necessary for the fuel transfer to take place. As was described above for the blocking input logic 22, the software implemented logic 20 also allows the user to individually determine which of the nine alarms may be blocked through the use of software On/Off switches.

If decision block 28 determines that a fuel transfer is not taking place, the logic 20 proceeds to decision block 30 where the logic 20 determines if the fuel in use in the gas turbine is natural gas. If block 30 determines that the fuel is natural gas the logic 20 proceeds to block 32 where the natural gas alarm levels are used for the nine different alarms. If block 30 determines that the fuel in use is not natural gas then the fuel in use must be the liquid fuel and the logic 20 proceeds to block 34 where the liquid fuel alarm levels are used for the nine different alarms.

The logic 20 then proceeds first to block 36 where it checks the quality of the inputs and then to decision block 38. If decision block 38 determines that the input signal quality is bad, the logic 20 returns to block 24 and then to block 26 to reset all counters and turn off all alarms. If decision block 38 determines that the input signal quality is not bad, that is, the quality is good, the logic 20 proceeds to decision block 39 which is the first block in FIG. 5.

Referring now to FIG. 5, the logic 20 determines at decision block 39 if the alarm output is on. If that output is on the logic proceeds to decision block 60 which is shown in FIG. 6. If that output is not on the logic proceeds to decision block 40.

Decision block 40 is one of the blocks in that part of logic 20 that is used to monitor the frequency. The frequency monitoring part of logic 20 comprises the adaptable limit of FIG. 5 that depends on which fuel alarm limit is to be used, three elapsed time timers, namely the alarm timer of FIG. 5, the silence trigger timer of FIG. 6, and the timer reset logic of FIG. 5; and the threshold trigger of FIG. 5. The limit and the timers are described in more detail below.

The alarm timer counts accumulated seconds when the frequency of the pulsation signal is greater than the alarm limit which as is described above depends on the fuel in use. When the alarm timer reaches a predetermined accumulated count, an alarm for this frequency and limit is generated. In the embodiment for logic 40 described herein the predetermined accumulated count of the alarm timer is set at 10 seconds.

The silence trigger timer begins its count when the frequency drops below the alarm value and continues its count as long as the frequency remains continuously below the alarm value. If the silence trigger timer reaches a count of a predetermined number of continuous seconds the alarm timer is reset to zero and the alarm timer will begin its counting once again when the frequency of the pulsation signal next becomes greater than the alarm limit. In the embodiment for logic 20 described herein the predetermined number of continuous seconds counted by the silence trigger timer is set at 60 seconds. The silence trigger timer is reset to zero whenever the frequency again goes above the alarm limit.

The threshold trigger timer is used to shut off an alarm once an alarm occurs. The threshold trigger timer begins timing once the frequency drops below the limit after an alarm is generated, that is, the frequency is above the alarm limit for the ten seconds count of the alarm timer. If the frequency drops below the associated alarm limit for a predetermined number of accumulated seconds, the alarm generated by the alarm timer is reset. In the embodiment for logic 20 described herein the predetermined number of accumulated seconds is set at 10.

Referring once again to FIGS. 5 and 6 and starting once again with FIG. 5 the logic for the timers described above is now described. Decision block 40 determines if the frequency of the pulsation signal is greater than the alarm limit. If block 40 determines that the frequency is greater than the alarm limit the logic proceeds to block 42 where the alarm timer is incremented. Logic 20 then proceeds to block 44 where the silence trigger timer is reset. The silence trigger timer begins its count when decision block 40 determines that the frequency of the pulsation signal drops below the alarm limit.

The logic 20 then proceeds to decision block 46 where it is determined if the count in the alarm timer is greater than ten accumulated seconds. If that determination is no, the logic 20 returns to decision start 27 as the logic will not output an alarm until the accumulated seconds count in the alarm timer is greater than ten seconds in the embodiment described herein for the logic 20.

If decision block 46 determines that the count in the alarm timer is greater than ten accumulated seconds, the logic proceeds to block 48 where an alarm is output. The logic then proceeds to block 50 where the alarm timer is reset to zero and then to start 27.

Returning once again to block 40, if that block determines that the frequency of the pulsation signal is not greater than the associated alarm limit, the logic proceeds to decision block 52. At block 52 the logic determines if the count in the alarm counter is greater than zero. If not the logic returns to start 27.

If decision block 52 determines that the count in the alarm timer is greater than zero the logic proceeds to block 54 where the silence trigger timer is incremented. The logic then proceeds to decision block 56 whereat it is determined if the count in the silence trigger timer is greater than 60 continuous seconds in the embodiment described herein for logic 20. If block 56 determines that the count in that timer is not greater than 60 continuous seconds the logic returns to start 27. If block 56 determines that the count in the silence trigger timer is greater than 60 continuous seconds then the logic proceeds to block 58 whereat the alarm timer is reset to zero. The logic then proceeds to start 27.

Logic 20 continues in FIG. 6. As was described above, when decision block 39 of FIG. 5 determines that the alarm output is on the logic proceeds to decision block 60 of FIG. 6. This decision block determines if the frequency is less than the limit. If block 60 determines that the frequency is not less than the limit, the logic returns to start 27.

When block 60 determines that the frequency is less than the limit, the logic proceeds to block 62 whereat it increments the threshold trigger timer. The logic, then proceeds to decision block 64 where it determines if the count in the threshold trigger timer is greater than 10 accumulated seconds in the embodiment of logic 20 described herein.

If decision block 64 determines that the count in threshold trigger timer is not greater than ten accumulated seconds the logic 20 returns to start 27. If decision block 64 determines that the threshold trigger timer is greater than 10 accumulated seconds the logic proceeds to block 66 whereat it shuts off the alarm. The logic then proceeds to start block 27.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for analyzing and conditioning the analog pulsation signal derived from combustion of fuel in a turbine, said method comprising the steps of:
   (a) converting said analog pulsation signal to a digital signal;
   (b) digitally filtering said digital signal;
   (c) providing from said digitally filtered digital signal a digital value which is the true RMS value of a user defined predetermined frequency band of said analog pulsation signal;
   (d) determining if an alarm output is on;
   (e) determining when an alarm output is not on if said digital true RMS value is greater than a predetermined alarm limit;
   (f) incrementing an alarm timer when said digital true RMS value is greater than said predetermined alarm limit; and
   (g) outputting an alarm when said count in said alarm timer is greater than a predetermined accumulated time.

2. The method of claim 1 further comprising the step of resetting said alarm timer to zero after said alarm output.

3. The method of claim 1 wherein said analog pulsation signal has a DC bias and said method comprises the further step of compensating for said DC bias in said analog pulsation signal.

4. A method for analyzing and conditioning the analog pulsation signal derived from combustion of fuel in a turbine, said method comprising the steps of:
   (a) converting said analog pulsation signal to a digital signal;
   (b) digitally filtering said digital signal;
   (c) providing from said digitally filtered digital signal a digital value which is the true RMS value of a user defined predetermined frequency band of said analog pulsation signal;
   (d) determining if an alarm output is on;
   (e) determining when said alarm output is not on if said digital true RMS value is greater than a user defined predetermined alarm limit; and
   (f) determining if an alarm counter has a count greater than zero when said digital true RMS value is not greater than said predetermined alarm limit.

5. The method of claim 4 further comprising the steps of:
   (g) incrementing a silence trigger timer when said alarm counter has a count greater than zero;
   (h) determining if said silence trigger timer has a count greater than a predetermined number of continuous seconds; and
   (i) resetting said alarm timer to a count of zero when said count in said silence trigger timer is greater than said predetermined number of continuous seconds.

6. The method of claim 4 wherein said analog pulsation signal has a DC bias and said method comprises the further step of compensating for said DC bias in said analog pulsation signal.

7. A method for analyzing the analog pulsation signal derived from combustion of fuel in a turbine, said method comprising the steps of:
   (a) converting said analog pulsation signal to a digital signal;
   (b) digitally filtering said digital signal;
   (c) providing from said digitally filtered digital signal a digital value which is the true RMS value of a user defined predetermined frequency band of said analog pulsation signal;
   (d) determining if an alarm output is on; and
   (e) determining when said alarm output is on if said digital true RMS value is less than a predetermined limit.

8. The method of claim 7 further comprising the steps of:
   (f) incrementing a threshold trigger timer when said digital true RMS value is less than said predetermined limit;
   (g) determining if said threshold trigger timer has a count greater than a predetermined number of accumulated seconds;
   (h) shutting off an alarm when said count in said threshold trigger timer is greater than said predetermined number of accumulated seconds.

9. The method of claim 7 wherein said analog pulsation signal has a DC bias and said method comprises the further step of compensating for said DC bias in said analog pulsation signal.

10. A method for analyzing the analog pulsation signal derived from combustion of fuel in a turbine, said method comprising the steps of:
    (a) converting said analog pulsation signal to a digital signal;
    (b) digitally filtering said digital signal;
    (c) providing from said digitally filtered digital signal a digital value which is the true RMS value of a user defined predetermined frequency band of said analog pulsation signal;
    (d) determining if at least one of a plurality of predetermined conditions exist to stop processing of said digital true RMS value; and
    (e) stopping processing of said true digital RMS value when at least one of said plurality of predetermined conditions exist.

11. The method of claim 10 wherein one of said plurality of predetermined conditions is that an alarm blocking input is on and said step of determining if at least one of said plurality of predetermined conditions exists determines if said alarm blocking input is on.

12. The method of claim 10 wherein another of said plurality of predetermined conditions is that a fuel transfer is in progress and said step of determining if at least one of said plurality of predetermined conditions exists determines if said fuel transfer is in progress.

13. The method of claim 10 wherein another of said plurality of predetermined conditions is that the quality of said true digital RMS value is bad and said step of determining if at least one of said plurality of predetermined conditions exists determines if said signal quality of said digital true RMS signal is bad.

14. The method of claim 10 further comprising the step of determining if an alarm output is on when none of said plurality of predetermined conditions to stop further processing of said digital true RMS value exist.

15. The method of claim 10 wherein said analog pulsation signal has a DC bias and said method comprises the further step of compensating for said DC bias in said analog pulsation signal.

16. An apparatus for analyzing an analog pulsation signal derived from combustion of fuel in a turbine, said apparatus comprising:
   (a) means for converting said analog signal to a digital signal;
   (b) a digital signal processor for digitally filtering said digital signal and providing therefrom a digital value of a user defined predetermined frequency band of said analog pulsation signal;
   (c) a digital processor; and
   (d) a routine executed by said digital processor for:
      (i) determining if an alarm output is on;
      (ii) determining when an alarm output is not on if said digital true RMS value is greater than a user defined predetermined alarm limit;
      (iii) incrementing an alarm timer when said digital true RMS value is greater than said predetermined alarm limit; and
      (iv) outputting an alarm when said count in said alarm timer is greater than a predetermined accumulated time.

17. The method of claim 16 wherein said analog pulsation signal has a DC bias and said apparatus further comprises means for compensating for said DC bias in said analog pulsation signal.

* * * * *